April 17, 1951  A. J. HUCK  2,549,094
TIMER FOR TOASTERS AND THE LIKE
Filed Dec. 22, 1947  2 Sheets-Sheet 1
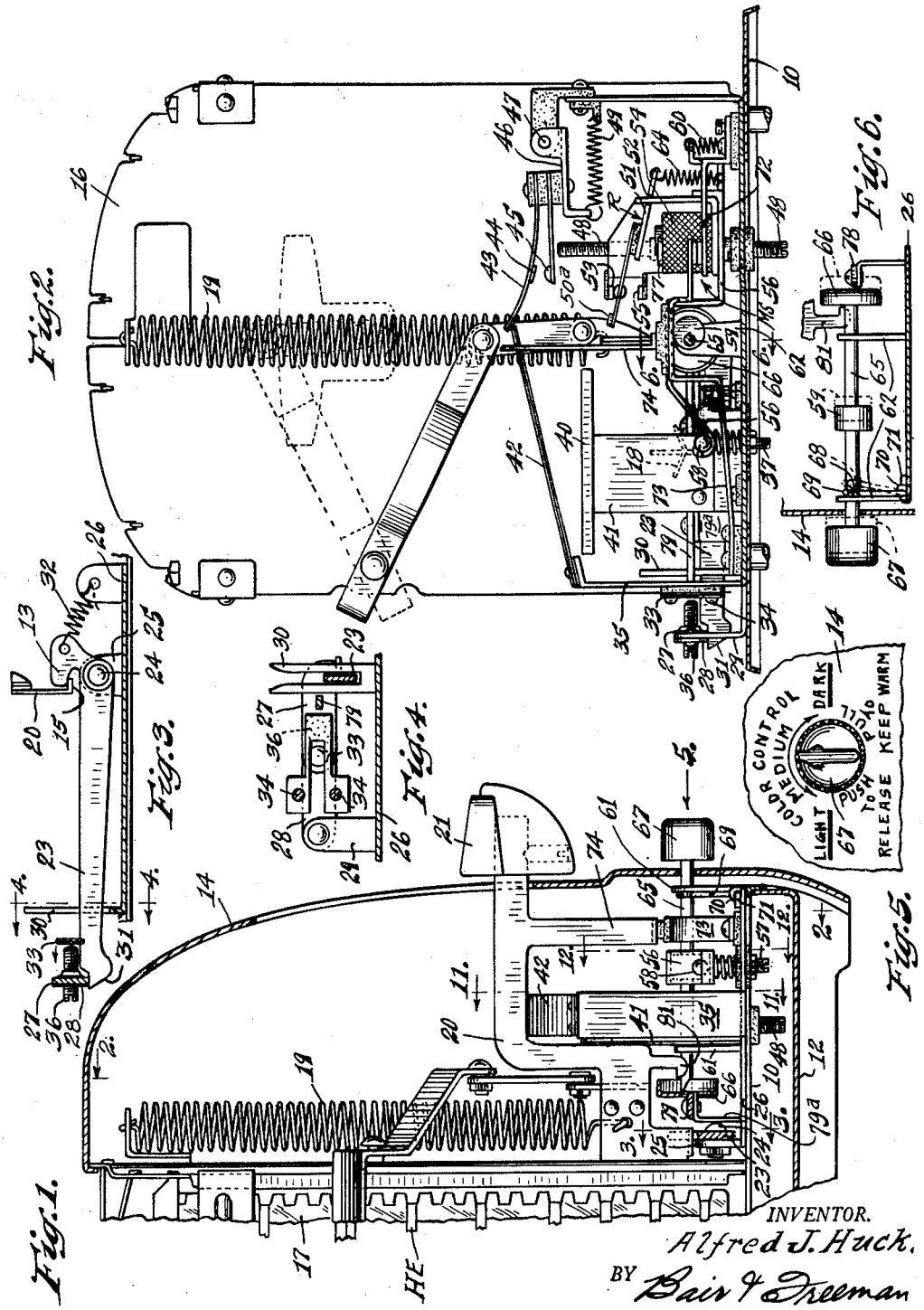
INVENTOR.
Alfred J. Huck.
BY Bair & Freeman
ATT'YS.

April 17, 1951  A. J. HUCK  2,549,094
TIMER FOR TOASTERS AND THE LIKE
Filed Dec. 22, 1947  2 Sheets-Sheet 2
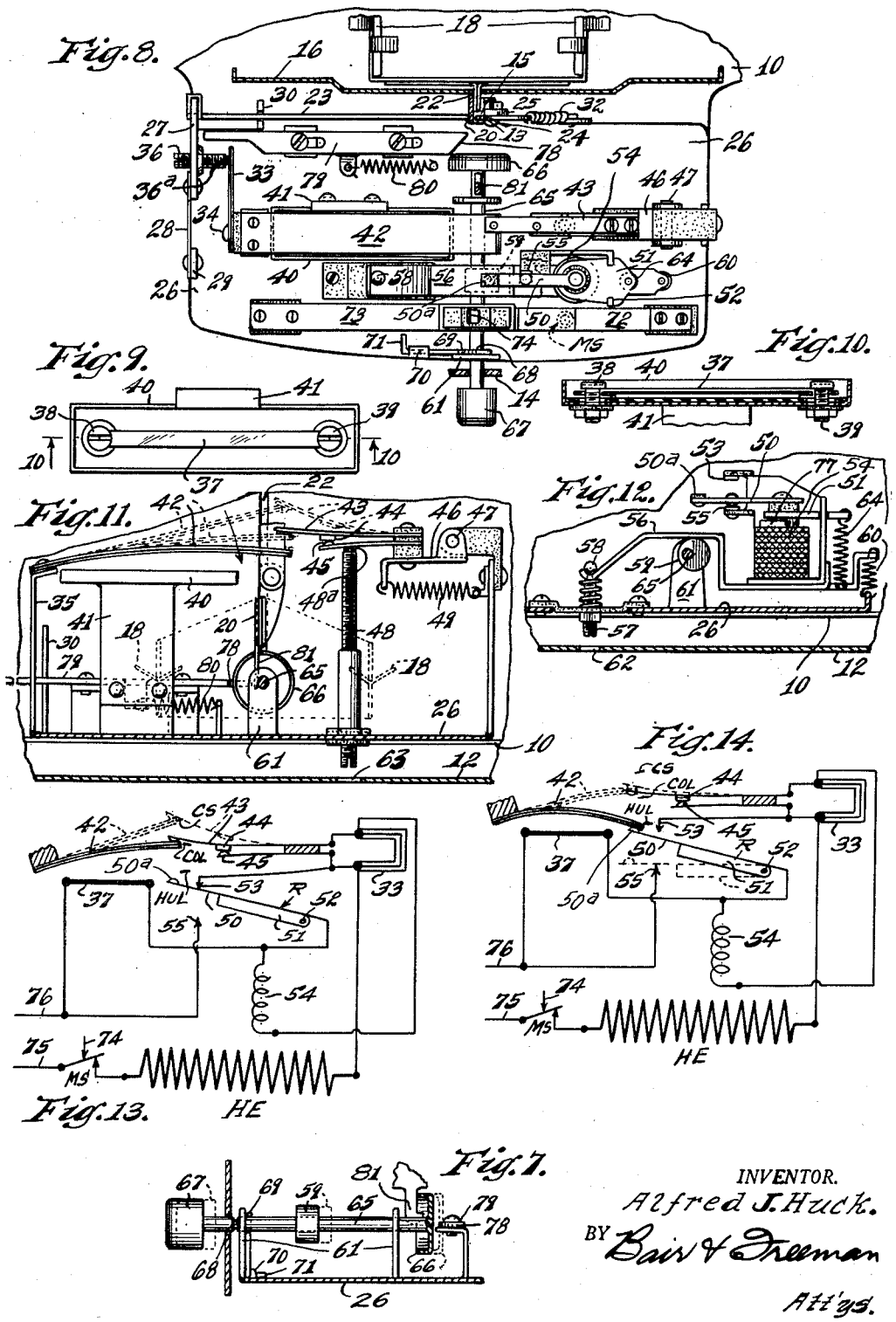

Patented Apr. 17, 1951

2,549,094

UNITED STATES PATENT OFFICE 2,549,094

TIMER FOR TOASTERS AND THE LIKE

Alfred J. Huck, St. Louis, Mo., assignor to Knapp-Monarch Company, St. Louis, Mo., a corporation of Delaware Application December 22, 1947, Serial No. 793,286

4 Claims. (Cl. 161—1)

This invention relates to a thermal timer for toasters and the like in which a thermally responsive element is heated by energizing a heating element therefor and warps to a heat-up limit whereupon the circuit is conditioned for deenergizing the thermal heater to permit the thermal element to return to a cool-off limit at which limit it causes actuation of means to terminate the operating cycle of the appliance.

One object of the invention is to provide a thermal timer in which the heater operates at a relatively high temperature and its heat is mainly radiated to a bimetal element for rapid heating thereof, the heater having a very minimum of thermal inertia due to its very small mass which, combined with heat radiation characteristics, causes unusually rapid response of the bimetal element in its heat-up and cool-down operation, the bimetal thereby reacting quickly to accurately respond to both the heat-up and cool-off conditions of the heater itself, and the bimetal element being arranged to warp toward the heater upon increase of temperature whereby its deflection rate increases near the end of the heat-up part of the timing cycle and with a consequent high rate of loss of heat during the cool-off part of the cycle to secure a maximum of timing accuracy and reliability of the bimetal action.

Another object is to provide for adjusting the timer for lighter or darker toast in addition to the normal adjustment of a control knob for this purpose so that the timer can be adjusted at the factory for even color on successive toasting operations, that is adjusted so that successively lighter loads of toast in one continuous run or successively darker loads can be corrected at the factory and subsequently by the service man or customer without the necessity of opening the toaster to gain access to the adjusting mechanism.

A further object is to provide a timer so designed that a minimum of load is had on the timing bimetal by having the bimetal arranged to engage only contact springs instead of mechanically operating latches, latch releases or the like which involve friction as from sliding parts and in which the friction load varies over a period of time, the contact springs in turn operating a relay and a thermal motor that acts as a latch release so that the power afforded by the electric current is utilized to overcome any friction loads that might be present in sliding or pivoting parts.

Still a further object is to provide a color control knob that can be adjusted by the user of the toaster by rotation, the knob being arranged to secure a three-way action in which a sliding movement of the knob in one direction manually releases the bread carrier of the toaster independent of the automatic timing release and sliding movement in the other direction prevents complete release of the bread carrier so that it will stay in lowered position to keep the toast warm from the residual heat in the toaster, thus eliminating all but two control elements on the toaster, one for depressing the bread carrier and the other being the three-way control knob just described.

An additional object is to provide a relay in the timer to deenergize the heater for the thermally responsive timing element for the purpose of providing a cool-down cycle portion and which is automatically reset at the end of each complete cycle so that no additional member is required to reposition the relay at the end or at the start of every successive timing cycle.

More specifically it is my object to provide a timer in which an electric heater is provided for a bimetal timing element and the timing element is operable to energize a relay at the end of a heat-up portion of the timing cycle, the relay then deenergizing the heater for the bimetal element so that it can cool down and at the end of the cool-off portion of the cycle a switch shunting a thermal motor type of latch for the bread carrier is opened for the purpose of energizing the latch and causing it to release the bread carrier, the entire toasting cycle then being represented by the heat-up time plus the cool-off time plus the latch operation time.

A further additional object is to provide color control in the form of a readily adjustable knob that determines the heat-up limit with factory or service adjustments additionally operable to change this limit and to change the cool-off limit, these last two adjustments being relatively less accessible than the control knob and inconspicuous by being hid within the housing of the toaster but nevertheless accessible by the insertion of a small tool through perforations in the housing.

With these and other objects in view, my invention consists in the construction, arrangement and combination of the various parts of my timer for toasters and the like whereby the objects contemplated are attained, as hereinafter more fully set forth, pointed out in my claims and illustrated in the accompanying drawings, wherein:

Figure 1 is a vertical sectional view through the housing and one end of a bread toaster, showing an end elevation of my timing mechanism together with some of the toaster mechanism.

Figure 2 is a front elevation of the timing mechanism and the toaster looking toward the left in Figure 1 and with the housing removed.

Figure 3 is a detail sectional view on the line 3—3 of Figure 1 showing a bread carrier latch lever and a latch element therefor.

Figure 4 is a sectional view on the line 4—4 of Figure 3.

Figure 5 is a fragmentary view of a portion of the toaster housing and a control knob looking in the direction of the arrow 5 adjacent the lower right portion of Figure 1.

Figure 6 is a detail sectional view on the line 6—6 of Figure 2 showing the parts in one position.

Figure 7 is a similar sectional view showing the parts in another position.

Figure 8 is a plan view of the timer mechanism.

Figure 9 is a plan view of a heater for a thermal timer element of the timer device.

Figure 10 is a sectional view of the heater taken on the line 10—10 of Figure 9.

Figure 11 is a sectional view on the line 11—11 of Figure 1 showing the parts in a different position than Figure 2.

Figure 12 is a similar sectional view on the line 12—12 of Figure 1 showing the parts in a different position than in Figure 2.

Figure 13 is an electro-diagrammatic view showing the parts in the position assumed during the heat-up portion of the timing cycle, and Figure 14 is a similar view showing the position that the parts assume at the end of the heat-up portion of the timing cycle.

On the accompanying drawings I have used the reference numeral 10 to indicate a base, 12 a cover for the base, and 14 the housing of a toaster. The toaster may include suitable framework including an end plate 16 and a heating element HE wound on sheet mica 17 or the like.

A bread carrier comprising bread supporting bars 18 is illustrated and these are connected to a bracket 20 which is vertically slidable in a slot 22 of the toaster frame. A handle 21 is mounted on the bracket 20 for depressing the bread carrier against the action of a spring 19 which normally raises the bread carrier.

The bracket 20 is provided with a lug 15 (see Figure 3) with which a locking lug of a latch lever 23 is adapted to coact for the purpose of holding the bread carrier in the lowered or toasting position. The latch lever 23 is pivoted at 24 to an ear 25 extending upwardly from a timer base plate 26.

The latch lever 23 in turn is adapted to be latched in position by a latch blade 27 which is spring biased to the latching position by being mounted on a leaf spring 28 secured to an ear 29 extending up from the base plate 26. A bifurcated bracket 30 also extending up from the base plate serves as a guide for the latch lever 23.

The lug 15, it will be noted, is slightly to the left of the pivot 24 for the purpose of swinging the latch lever 23 downwardly when the bread carrier is lowered thus causing an inclined cam surface 31 on the left end of the lever in Figure 3 to engage the latch blade 27 and move it toward the left until it snaps over the upper end of the cam 31. This latching action is accomplished in opposition to a spring 32 which tends to rotate the latch lever 23 about the pivot 24.

For releasing the latch 27 I provide a latch release element 33 in the form of a U-shaped bimetal element as shown in Figure 4 anchored by means of mounting screws 34 on a bracket 35 extending up from the base plate 26. When electric current flows through the element 33 from one screw to the other it causes the element to warp toward the left in Figure 3 for engaging an adjusting screw 36 carried by the latch blade 27 to effect release of the latch lever therefrom. The mechanism for energizing the latch release 33 at the proper time will now be described. The screw 36 is insulated from the element 33 by means of a ceramic tip 36a.

A thermal timer heater is provided in the form of a resistance ribbon of Nichrome or the like 37. The heater 37 is supported on terminal screws 38 and 39 which in turn are supported by a channel-shaped housing 40. The housing 40 is supported by a bracket 41.

Above the housing 40 is a thermal timer element 42 in the form of a strip of bimetal anchored at one end to the bracket 35. The opposite end of the bimetal 42 engages an insulating button on a leaf spring 43 to space a contact 44 carried thereby from a contact 45. These contacts are supported by a bracket 46 pivoted at 47 with the leaf spring for the contact 45 held against a cool-down or "follow-up" adjusting screw 48 by a spring 49. The screw 48 is insulated from the leaf spring for the contact 45 by means of a ceramic tip 48a.

The free end of the bimetal element 42 deflects downwardly upon an increase of heat, such heat being radiated from the heater 37. The deflection from a cold start is shown at CS in Figure 13 and passes through a cool-off limit position COL to terminate at a heat-up limit HUL. At the cool-off limit the contact 44 engages the contact 45. At the heat-up limit the bimetal element 42 engages an insulating button 50a on a contact blade 50 carried by an armature 51 pivoted at 52 and normally spring held engaged with a contact 53 by a spring 64.

A relay coil 54 is adapted at times to attract the armature 51, the armature and coil constituting a relay indicated generally at R. When the relay coil thus attracts the armature it swings the blade 50 to contact with a contact 55. The various contacts enumerated are in an electric circuit which will be described later.

The relay R is mounted on a bracket 56 pivoted against a ball head 58 of a toast color adjusting screw 57 and held against a cam 59 by a spring 60. The cover 12 is provided with a perforation 62 through which access may be had to the screw 57 by means of a small screw driver. The cover 12 is also provided with a perforation 63 for gaining access to the adjusting screw 48. The perforations 62 and 65 eliminate the necessity of removing the cover 12 to gain access to the screws 57 and 48 yet access is not readily obvious to the user of the appliance whereas both the factory employees and service employees and service men would be specifically instructed with respect to the adjusting means.

The cam 59 is secured to a shaft 65 journalled in a pair of brackets 61 extending upwardly from the base plate 26. The shaft has a disc 66 on its inner end provided with a peripheral flange, and a control knob 67 on its outer end. The markings shown in Figure 5 are provided on the housing 14 for cooperation with the knob 67 as will hereinafter appear.

Referring to Figures 6 and 7, the shaft 65 has a peripheral groove 68 in which a spring 69 bears, the spring being anchored in an ear 70 extending up from the base plate 26 and having an end 71 bearing against the base plate. The toaster has one or more heating elements HE which are controlled as to energization by a main switch MS. The main switch may comprise a pair of brackets 72 and 73 carrying contacts that are normally disengaged due to the resiliency of the bracket 73. The bracket 20 of the bread carrier has a downward extension 74 for engaging the bracket 73 and closing the contacts of the main switch when the bread carrier is depressed all the way, these contacts remaining closed when the bread carrier rises slightly to the latched positions of Figures 1 and 3.

*Practical operation*

In the operation of my toaster timer, assuming that the toaster is to be automatically timed for medium color toast, the knob 67 is adjusted to the "medium" position as shown for instance in Figure 5 and neither pushed nor pulled so that the knob is in the full line position of Figure 6. The knob 21 on the bracket 20 is now pushed downwardly for depressing the bread carrier bars 18 and as it approaches the lower limit of movement its lug 15 will engage the latch lever 23 for latching it under the latch 27 as already described. Then when the knob 21 is released it will rise slightly to the position shown in Figure 1 which engages the lug 15 under the lug 13 (see Figure 3) to hold the bread carrier in the lowered position.

Referring to the circuit shown in Figure 13, the extension 74 of the bracket 20 has closed the main switch MS so that a circuit is provided from a supply wire 75 through the heating element HE and through the elements 53, 50 and 37 in series back to a second supply wire 76. Thus the heating element and the heater 37 are the only two elements of the timer now in the circuit.

The heating element of course radiates heat to the bread for toasting it and the heater 37 radiates heat to the timer element 42 to cause it to warp from the cold start position shown by dotted lines toward the heat-up limit HUL. After a time period the bimetal 42 reaches the cool-off limit COL which permits the contact 44 to close against the contact 45 without in any way affecting the electric circuit.

The bimetal 42 accordingly warps farther and finally reaches the heat-up limit HUL as shown by solid lines in Figure 14 which effects separation of the contact blade 50 from the contact 53 thus breaking the circuit between the right hand end of the heating element HE and the right hand end of the heater 37.

The current from the right hand end of the heating element now passes across the contacts 45 and 44 to the relay coil 54 and from this coil through the heater 37. The coil 54 being now energized quickly attracts the armature 51 for shunting the heater 37 out of the circuit by closure of the blade 50 against the contact 55, these two elements being connected in a shunt circuit with the heater 37. Thus the heating element HE is left energized with its current passing through the relay coil 54 which coil is of heavy wire so as not to restrict the current to the heating element and the relay is preferably of the kind provided with a shading coil 77 so that it will operate on A. C. without hum.

Deenergization of the heater 37 terminates the radiation of heat to the bimetal element 42 so that the bimetal element almost immediately starts to cool down. There is a slight amount of residual heat but the relatively thin resistance ribbon 37 which was operated at relatively high temperatures since the thousand watts or so of current for the heating element has been passing through it quickly cools down so there is substantially no delay in the commencement of the cool-off portion of the operating cycle of the bimetal element 42.

When the element 42 reaches the cool-off limit COL it separates the contact 44 from the contact 45 as illustrated by dotted lines in Figure 14. The switch 44—45 shunts the bimetal latch release element 33 so that when this switch is opened the current then passes through the latch release causing it to heat in a matter of very few seconds to a temperature that warps it to the release position thereby releasing the latch blade 27 from the latch lever 23 so that the combined action of the springs 32 and 19 rotates the latch lever 23 clockwise in Figure 3 and raises the bread carrier. For securing proper thermal timing of a complete toasting cycle the heat-up limit HUL is adjustable by two methods, either of which provides longer cycle timing by lowering the relay 54 and therefore the HUL point relative to the bimetal element 42. The normal method of accomplishing this when the toaster is in use is to lower the right end of the lever 56 by suitable rotation of the knob 67. This normal method is the one practiced by the user of the toaster.

The secondary method of accomplishing this is to lower the right end of the lever 56 by adjusting the screw 57 to raise its left end with the lever pivoting around the cam 59. This second method is useful for setting the timing cycle of the switch at the factory or in the service station without altering the setting of the knob 67.

For securing proper timings on successive cycles (or loads of toast) after the toaster has been heated during one toasting cycle the cool-off limit COL is adjustable by means of adjusting the screw 48. When 48 is adjusted to raise the cool-off limit by causing the bracket 46 to move in a clockwise direction around the pivot 47 (see Figure 11) the successive toasting cycles will provide successively darker toast or by moving the bracket counter-clockwise the result will be lighter toast. The screw 48 is accessible through the opening 63 so that this adjustment can be made at the factory or at the service station without dis-assembling the toaster, and after such adjustments are made then in order to have all slices lighter or darker as desired the color-control knob 67 is rotated by the user in the appropriate direction.

In the event, after the timer is set, the user of the toaster wants to release the bread carrier and discontinue the timing operation, he can do so by pushing inwardly on the knob 67 (dotted position of Figure 6) which causes the disc 66 to move upwardly in Figure 8 and engage an inclined cam surface 78 of a release bar 79 which is slidably mounted on a pair of brackets 79a. This bar is normally held in one position by a spring 80 and when moved against the action of the spring it engages the latch blade 27 for releasing it independent of the latch release bimetal element 33. The spring 69 would then be in the dotted position of Figure 6 tending to slide the shaft 65 back toward the left to the normal position of Figure 1, so that when the knob 67 is released it will spring out again to such normal position.

In some instances it is desirable to keep the toast warm by permitting the main switch to open but keeping the bread carriers in the lowered position so that the toast will be kept warm and will be further dried out by the residual heat in the toaster. This is accomplished by pulling out on the knob 67 so that the flange on the disc 66 overhangs a hook-like lug 81 on the bracket 20 (full line position of Figure 7) which permits only limited upward movement of the bread carriers at the end of the toasting cycle, the cycles of course being terminated by the timing mechanism in the usual manner. The amount of upward motion is sufficient to permit the main switch to open yet keep the toast well down in the toaster. Then when it is desirable to use the toast the knob 67 is pushed into the normal position which releases the flanges of the disc 66 from the lug 81 (dotted position in Figure 7).

The spring 69, in the position of the knob 67 to keep the toast warm, is shown in Figure 7. The groove 68 has snapped out of engagement with the spring so that the knob 67 will stay in its outer position yet the spring 69 will snap back into the groove when the knob is pushed inwardly to the normal position shown by dotted lines in this figure.

I have disclosed a toaster timer having a number of advantages as outlined in the objects of this specification. While the timer has been described specifically for a toaster it can be used in conjunction with other types of electrical appliances where it is possible to perform a timing cycle by means of a thermally operated timer. The general principle of a heat-up, cool-down type of timer has been combined with a relay which shunts out the heater for the timer bimetal and a thermal latch is so shunted by a switch (44—45) operated by the thermally responsive element that efficient operation is had with accurate timing in all cycles of operation. The elements of the timer are so arranged and so provided with adjustments that even toasting in successive cycles can be adjusted into any toaster-timer combination regardless of normal variations in manufacture or materials. After these adjustments are made the timer will then produce even-colored toast whether adjusted at the knob 67 for light, medium or dark toast.

Some changes may be made in the construction and arrangement of the parts of my timer without departing from the real spirit and purpose of my invention, and it is my intention to cover by my claims any modified form of structure or use of mechanical equivalents which may be reasonably included within their scope.

I claim as my invention:

1. In an automatic thermal control, an element manually movable to render said control operative, a current responsive latch for said element in the operative position, a switch shunting said current responsive latch, a temperature responsive element for closing said switch when the temperature responsive element responds to heat and to open it when the temperature responsive element cools down, a heater for said temperature responsive element, a single pole double throw relay having normally closed contacts in series circuit with said heater and connected with one side of said current responsive latch, said relay having normally open contacts shunting said heater, the coil of said relay being connected at one end to a point between said heater and said normally closed contacts and at its other end to the other side of said current responsive latch, said temperature responsive element, after opening said switch, opening said normally closed contacts for energizing said relay coil through said switch so that the relay coil closes said normally open contacts to shunt said heater and thereby permit said temperature responsive element to cool and reopen said switch for permitting the current through said relay coil to flow through said current responsive latch and thereby render it operative to release said manually movable element.

2. In an automatic thermal control, an element manually movable to render said control operative, a current responsive latch for said element in the operative position, a switch shunting said current responsive latch, a temperature responsive element for closing said switch when the temperature responsive element responds to heat and to open it when the temperature responsive element cools down, a heater for said temperature responsive element, a single pole double-throw relay having normally closed contacts in series circuit with said heater and connected with one side of said current responsive latch, said relay having normally open contacts shunting said heater, the coil of said relay being connected at one end to a point between said heater and said normally closed contacts and at its other end to the other side of said current responsive latch, said temperature responsive element, after opening said switch, opening said normally closed contacts for energizing said relay coil through said switch so that the relay coil closes said normally open contacts to shunt said heater and thereby permit said temperature responsive element to cool and reopen said switch for permitting the current through said relay coil to flow through said current responsive latch and thereby render it operative to release said manually movable element, and means for adjusting the point in the travel of said temperature responsive element at which said switch is closed as the element heats up and opens as the element cools down.

3. In an automatic thermal control, an element manually movable to render said control operative, a current responsive latch for said element in the operative position, a switch shunting said current responsive latch, a temperature responsive element for closing said switch when the temperature responsive element responds to heat and to open it when the temperature responsive element cools down, a heater for said temperature responsive element, a single pole double-throw relay having normally closed contacts in series circuit with said heater and connected with one side of said current responsive latch, said relay having normally open contacts shunting said heater, the coil of said relay being connected at one end to a point between said heater and said normally closed contacts and at its other end to the other side of said current responsive latch, said temperature responsive element, after opening said switch, opening said normally closed contacts for energizing said relay coil through said switch so that the relay coil closes said normally open contacts to shunt said heater and thereby permit said temperature responsive element to cool and reopen said switch for permitting the current through said relay coil to flow through said current responsive latch and thereby render it operative to release said manually movable element, and means for adjusting the point in the travel of said temperature responsive element at which said normally closed contacts are opened as the element heats up.

4. In an automatic thermal control, an element manually movable to render said control operative, a current responsive latch for said element in the operative position, a switch shunting said current responsive latch, a temperature responsive element for closing said switch when the temperature responsive element responds to heat and to open it when the temperature responsive element cools down, a heater for said temperature responsive element, a single pole double-throw relay having normally closed contacts in series circuit with said heater and connected with one side of said current responsive latch, said relay having normally open contacts shunting said heater, the coil of said relay being connected at one end to a point between said heater and said normally closed contacts and at its other end to the other side of said current responsive latch, said temperature responsive element, after opening said switch, opening said normally closed contacts for energizing said relay coil through said switch so that the relay coil closes said normally open contacts to shunt said heater and thereby permit said temperature responsive element to cool and reopen said switch for permitting the current through said relay coil to flow through said current responsive latch and thereby render it operative to release said manually movable element, and means for adjusting the point in the travel of said temperature responsive element at which said switch is closed as the element heats up and opens as the element cools down, and the point in the travel of said temperature responsive element at which said normally closed contacts are opened as said element heats up.

ALFRED J. HUCK.

REFERENCES CITED

The following references are of record in the file of this patent:

UNITED STATES PATENTS

| Number | Name | Date |
| --- | --- | --- |
| 2,164,204 | Anderson | July 11, 1939 |
| 2,196,380 | Biebel | Apr. 9, 1940 |
| 2,266,045 | Ireland | Dec. 16, 1941 |
| 2,362,751 | Huck | Nov. 14, 1944 |
| 2,370,404 | Huck | Feb. 27, 1945 |